United States Patent
Ishikawa

(10) Patent No.: US 8,928,959 B2
(45) Date of Patent: Jan. 6, 2015

(54) IMAGE READING APPARATUS FACILITATING JAM CLEAR

(71) Applicant: Hiroko Ishikawa, Handa (JP)

(72) Inventor: Hiroko Ishikawa, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/163,492

(22) Filed: Jan. 24, 2014

(65) Prior Publication Data

US 2014/0211281 A1 Jul. 31, 2014

(30) Foreign Application Priority Data

Jan. 31, 2013 (JP) ................................ 2013-016406

(51) Int. Cl.
- *H04N 1/04* (2006.01)
- *H04N 1/32* (2006.01)

(52) U.S. Cl.
CPC ................................... *H04N 1/3263* (2013.01)
USPC ........... 358/498; 358/474; 358/497; 358/496; 271/225; 399/367

(58) Field of Classification Search
CPC .......... B65H 2220/02; B65H 2220/01; B65H 2511/20; B65H 2513/41; B65H 2513/512; B65H 2513/514; B65H 2701/1311; B65H 2701/1313; B65H 2220/03; B65H 2403/422; B65H 2403/481; B65H 2403/721
USPC .................. 358/498, 474, 496, 497; 399/367; 271/10.01, 114, 186, 225
See application file for complete search history.

(56) References Cited

U.S. PATENT DOCUMENTS

| | | | | |
|---|---|---|---|---|
| 5,344,134 A | * | 9/1994 | Saeki et al. | 271/122 |
| 7,355,761 B2 | * | 4/2008 | Yang | 358/474 |
| 7,605,956 B2 | * | 10/2009 | Lee | 358/498 |
| 7,694,963 B2 | * | 4/2010 | Iwago et al. | 271/258.01 |
| 7,769,322 B2 | * | 8/2010 | Ishihara et al. | 399/125 |
| 2003/0234965 A1 | * | 12/2003 | Yang | 358/498 |
| 2012/0161382 A1 | * | 6/2012 | Morinaga et al. | 271/10.01 |
| 2014/0092453 A1 | * | 4/2014 | Ishikawa | 358/498 |

FOREIGN PATENT DOCUMENTS

JP 2006-086817 A 3/2006

OTHER PUBLICATIONS

Co-Pending U.S. Appl. No. 14/151,939, filed Jan. 10, 2014.

* cited by examiner

*Primary Examiner* — Negussie Worku
(74) *Attorney, Agent, or Firm* — Banner & Witcoff, Ltd.

(57) ABSTRACT

An image reading apparatus includes a reading unit, a conveyance unit, a carriage, a motor, a motor gear, a conveyance gear, a carriage gear, a switching gear, and a control device. The conveyance unit is configured to convey a document from a document tray. The switching gear is configured to be placed in either one of a first position where the motor gear is communicated with the conveyance gear and a second position where the motor gear is communicated with the carriage gear. The control device is configured to: control the motor to rotate the motor gear in a first direction to have the switching gear free from the conveyance gear in response to a determination that the document jam has occurred; and control the motor to rotate the motor gear in a second direction to have the switching gear communicate with the conveyance gear.

10 Claims, 12 Drawing Sheets

IMAGE READING APPARATUS FACILITATING JAM CLEAR

CROSS-REFERENCE TO RELATED APPLICATION

This application claims priority from Japanese Patent Application No. 2013-016406 filed on Jan. 31, 2013. The entire content of the priority application is incorporated herein by reference.

TECHNICAL FIELD

The present invention relates to an image reading apparatus.

BACKGROUND

An image reading apparatus described in Japanese Patent Application Publication No. 2006-86817 is well-known in the art. The conventional image reading apparatus includes a reading unit such as a CIS for reading a document, a conveyance unit for conveying a document to the reading unit, a carriage for moving the reading unit, a single motor for driving the moving unit and the conveyance unit, and a switching gear serving as a transmission unit for transmitting drive power of the motor. The switching gear switches its position between a conveyance position at which the transmission unit transmits the power to the conveyance unit and a carriage position at which the transmission unit transmits the power to the moving unit, whereby the conveyance unit and the moving unit can be driven by a single motor.

SUMMARY

Upon a jam occurrence in the conveyance unit, a user can easily clear the jam in the conveyance unit by moving the switching gear away from the conveyance position in a configuration in which both the transfer unit and the conveyance unit are driven by one motor, that is, in a configuration in which a position of the switching gear is switched between the carriage position and the conveyance position. However, an appropriate position for retaining the switching gear after clearing the jam has not yet been discussed in the configuration.

In view of the foregoing, it is an object of the present invention to provide an image reading apparatus capable of retaining the switching gear at an appropriate position after clearing the jam in a configuration in which the position of the switching gear is switched between the carriage position and the conveyance position.

In order to attain the above and other objects, the invention provides an image reading apparatus. The image reading apparatus includes a reading unit, a conveyance unit, a carriage, a motor, a motor gear, a conveyance gear, a carriage gear, a switching gear, and a control device. The conveyance unit is configured to convey a document from a document tray. The carriage is configured to support the reading unit. The motor gear is coupled to the motor. The conveyance gear is configured to communicate with the conveyance unit. The carriage gear is configured to communicate with the carriage. The switching gear is configured to be placed in either one of a first position where the motor gear is communicated with the conveyance gear via the switching gear and a second position where the motor gear is communicated with the carriage gear via the switching gear. The control device configured to: determine whether to occur a document jam; control the motor to rotate the motor gear in a first direction to have the switching gear free from the conveyance gear in response to a determination that the document jam has occurred; determine whether the document jam is cleared; determine whether the document is present on the document tray; and control the motor to rotate the motor gear in a second direction different from the first direction to have the switching gear communicate with the conveyance gear in response to a determination that the document is present on the document tray when determining that the document jam is cleared.

BRIEF DESCRIPTION OF THE DRAWINGS

The particular features and advantages of the invention as well as other objects will become apparent from the following description taken in connection with the accompanying drawings, in which.

DETAILED DESCRIPTION

An embodiment of the present invention will be described with reference to the drawings.

[External Configuration of Image Reading Apparatus]

Figure 1:
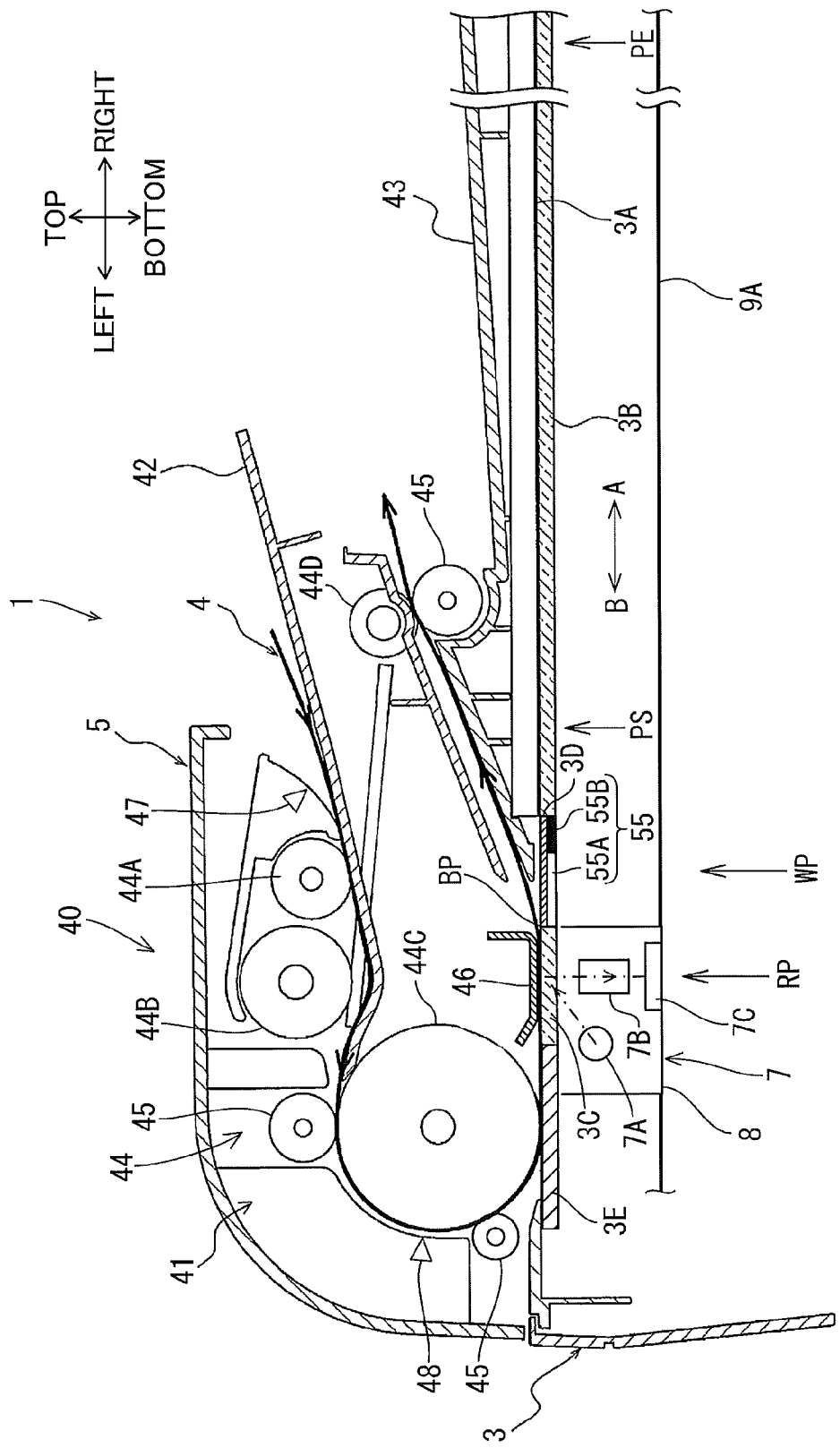
FIG. 1 is an enlarged schematic cross-sectional view of an image reading apparatus according to a preferred embodiment of the present invention.
Figure 2:
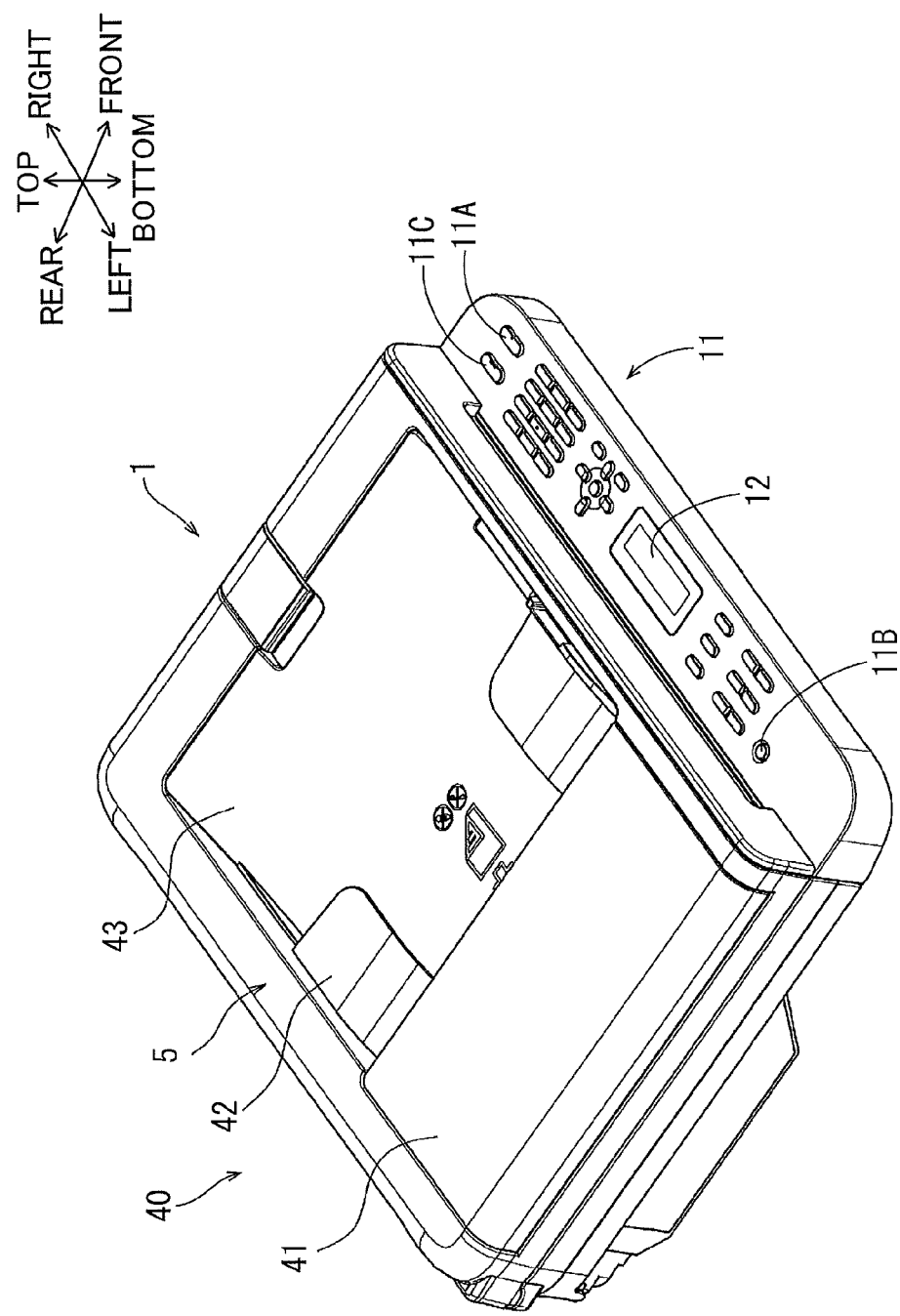
FIG. 2 is a schematic perspective view of the image reading apparatus in a state where a document cover is closed according to the preferred embodiment of the present invention
Figure 3:
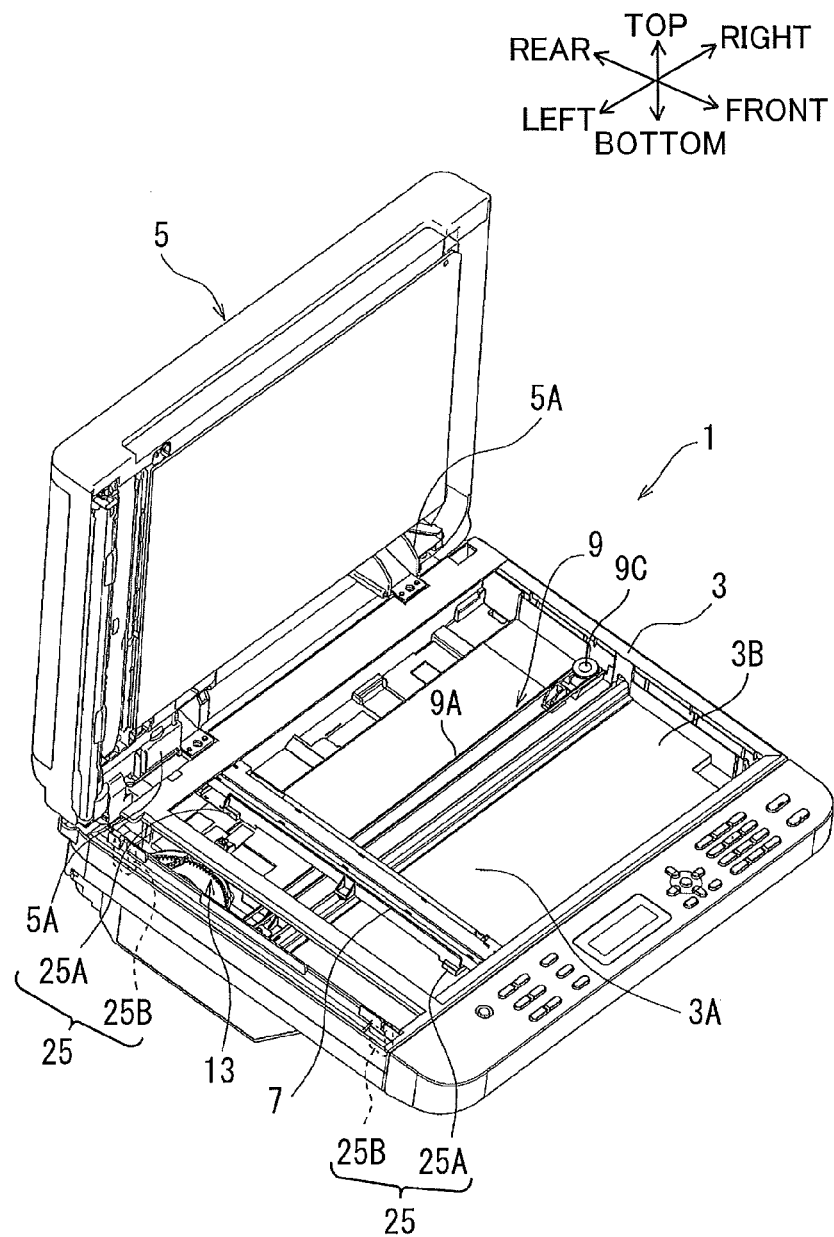
FIG. 3 is a schematic perspective view of the image reading apparatus in a state where the document cover is open according to the preferred embodiment of the present invention.

The term "top" of an image reading apparatus 1 is defined as top side of the FIG. 1, the term "left" as left side of FIG. 1, and the term "front" as front side of FIG. 1. As shown in FIGS. 1 to 3, the image reading apparatus 1 includes a reading unit 7, a carriage 8, a moving mechanism 9 for conveying the carriage 8, an Auto Document Feeder 40 (hereinafter abbreviated to "ADF"), and a document platen 3. The image reading apparatus 1 has a front side portion provided with an operation unit 11 and a display unit 12 such as a liquid crystal display. The operation unit 11 is provided with a read start key 11A, a power key 11B, and a clear reception key 11C.

The image reading apparatus 1 has, as an image reading mode, a carriage-moving mode (hereinafter, referred to as "FB (Flat-Bed) reading mode, example of a second mode") in which the reading unit 7 reads an image of a document conveyed by the carriage 8 and a sheet-conveying mode (hereinafter, referred to as "ADF reading mode", example of a first mode) in which the reading unit 7 reads an image of a document conveyed by a conveying unit 44 (see FIG. 1) of the ADF 40. The image reading apparatus 1 may be a stand-alone scanner or copier, or a part of so-called a multifunctional device having printer and facsimile functions.

As shown in FIG. 3, the document platen 3 has a platen 3B such as a glass or acrylic transparent as a first reading window. The platen 3B defines a placement surface 3A on which a document is placed. A document cover 5 is assembled immediately above the document platen 3 via a hinge mechanism 5A.

The document cover 5 is pivotally movable between a closed position (FIG. 2) covering the document platen 3 and a remote position (FIG. 3) away from the document platen 3. In the FB reading mode, a user needs to manually move the document cover 5 upward and place a document on the document platen 3.

As shown in FIG. 3, the image reading apparatus 1 further includes a drive transmission mechanism 13 and a load generation unit 25. The load generation unit 25 includes a pair of first contacted portions 25A provided in the reading unit 7 and a pair of first stoppers 25B provided in the document platen 3 each corresponding to the pair of first contacted portions 25A.

The reading unit 7 moving along the placement surface 3A is provided immediately below the placement surface 3A (see FIG. 1). The reading unit 7 emits the light to a document and receives emitted light reflected from the document and generates an electric signal based on the received light. The image reading apparatus 1 converts characters and the like written on the document into the electric signal generated in the reading unit 7.

The reading unit 7 is adapted to read the document with a CIS (Contact Image Sensor) system. The reading unit 7 includes a linear image sensor 7C having a plurality of light receiving elements, a light source 7A constituted by RGB three-color light emitting diodes (LEDs), and a rod lens array 7B that focuses light reflected from the document onto the light receiving elements of the linear image sensor 7C, and those are linearly arranged in a direction perpendicular to a paper surface, i.e. front-to-rear direction.

The carriage 8 for supporting the reading unit 7 is coupled to a toothed belt 9A described later and moves in a conveyance direction, i.e., an arrow A and arrow B as depicted in FIG. 3, with movement of the toothed belt 9A. The toothed belt 9A is driven by a drive power transmission mechanism to be described later through a toothed pulley 9B (see FIG. 4). The image reading system of the reading unit 7 is not limited to the CIS system, and the reading unit 7 may adopt so-called a CCD system using an optical reduction system and a CCD (Charge-Coupled Device) image sensor.

When reading the document placed on the platen 3B, that is, in the FB reading mode, the reading unit 7 reads the document while being conveyed, at a constant speed, by the carriage 8 coupled to the toothed belt 9A in the conveyance direction (direction of the arrow A of FIG. 1) parallel to a plate surface of the platen 3B from a waiting position WP. The reading unit 7 can read the document within a read range in the conveyance direction defined between a read start position PS and a read end position PE (see FIG. 1). In the present embodiment, the read start position PS is fixed irrespective of a read range of the document, and the read end position PE is changed according to the read range of the document.

On the other hand, when reading the document conveyed by the ADF 40, that is, in the ADF reading mode, the image reading unit 7 reads the document while being retained, by the carriage 8, at a conveyance reading position (hereinafter, referred to as "ADF reading position") RP immediately below a second reading window 3C.

As shown in FIG. 3, a document pressing member 46 is provided at a position immediately above the second reading window 3C, i.e., at a position opposite to the reading unit 7 positioned at the ADF reading position RP with respect to the second reading window 3C. The document pressing member 46 is adapted to push the document during the ADF reading mode. The reading unit 7 is positioned at the ADF reading position RP and reads the document pressing member 46 in the absence of the document. In the present embodiment, the document pressing member 46 has a confronting surface in confrontation with reading unit 7 and provided with a white reference board 46A.

The moving mechanism 9 illustrated in FIG. 3 includes a first and second toothed pulleys 9B (see FIG. 4) and 9C which are fixed to the document platen 3 and the toothed belt 9A looped around the first and second toothed pulleys 9B and 9C. The toothed belt 9A moves upon the rotation of the first toothed pulley 9B. The carriage 8 is connected to the toothed belt 9A, thereby moving depending on a moving direction of the toothed belt 9A.

The second reading window 3C is also closed by a transparent platen such as a glass similarly to the first reading window, i.e., placement surface 3A. As shown in FIG. 3, the placement surface 3A and the second reading window 3C are separated by a beam-like partitioning member 3D, and the second reading window 3C is provided between the partitioning member 3D and a left end portion 3E of the document platen 3.

As shown in FIG. 1, the partitioning member 3D has an adjustment reference board 55. The adjustment reference board 55 is provided for readjusting reference of color and shading at a reading process for reading the document by the reading unit 7 and a reference position of the reading unit 7.

The adjustment reference board 55 includes a white tape 55A and a black tape 55B arranged in a sub-scan direction (left-right direction of FIG. 1). In the present embodiment, the waiting position WP is a position corresponding to the white tape 55A in the left-right direction of FIG. 1. The waiting position WP is a position where the carriage 8 stays during a non-execution of the FB reading mode and the ADF reading mode.

As shown in FIG. 1, the document cover 5 is provided with the ADF 40. The ADF 40 includes a conveyance path 4, an ADF cover 41 (example of a cover), a supply tray 42 (example of a document tray), a supply roller 44A, conveyor rollers 44B and 44C, a discharge roller 44D, and a discharge tray 43 utilizing a top surface of the document cover 5. Further, the document cover 5 is further provided with a plurality of driven rollers 45 opposite to the conveyor roller 44C and the discharge roller 44D.

The ADF cover 41 is provided with a front sensor 47 (example of a document sensor), such as a photosensor, adapted to detect whether the document is placed on the supply tray 42 and then output a signal. The front sensor 47 is turned ON upon the detection of the document.

The conveyance unit 44 is provided with a rear sensor 48 (example of a document sensor), such as a photosensor, adapted to detect whether the document conveyed by the conveyer rollers 44B and 44C is presence in the conveyance path 4. The rear sensor 47 is turned ON upon the detection of the document.

In the conveyance path 4, the rear sensor 48 is provided on a downstream of the supply tray 42 and an upstream of the reading unit 7 in a document conveyance direction of the conveyance path 4. The rear sensor 48 mainly detects the jammed document in the conveyance path 4.

[Configuration of Drive Power Transmission Mechanism]

In the present embodiment, the moving mechanism 9 and the conveyance unit 44 are driven by a single motor 31. That is, the drive transmission mechanism 13 selectively transmits drive power, i.e., a motor torque, generated in the motor 31 to the moving mechanism 9 and the conveyance unit 44.

Figure 4:
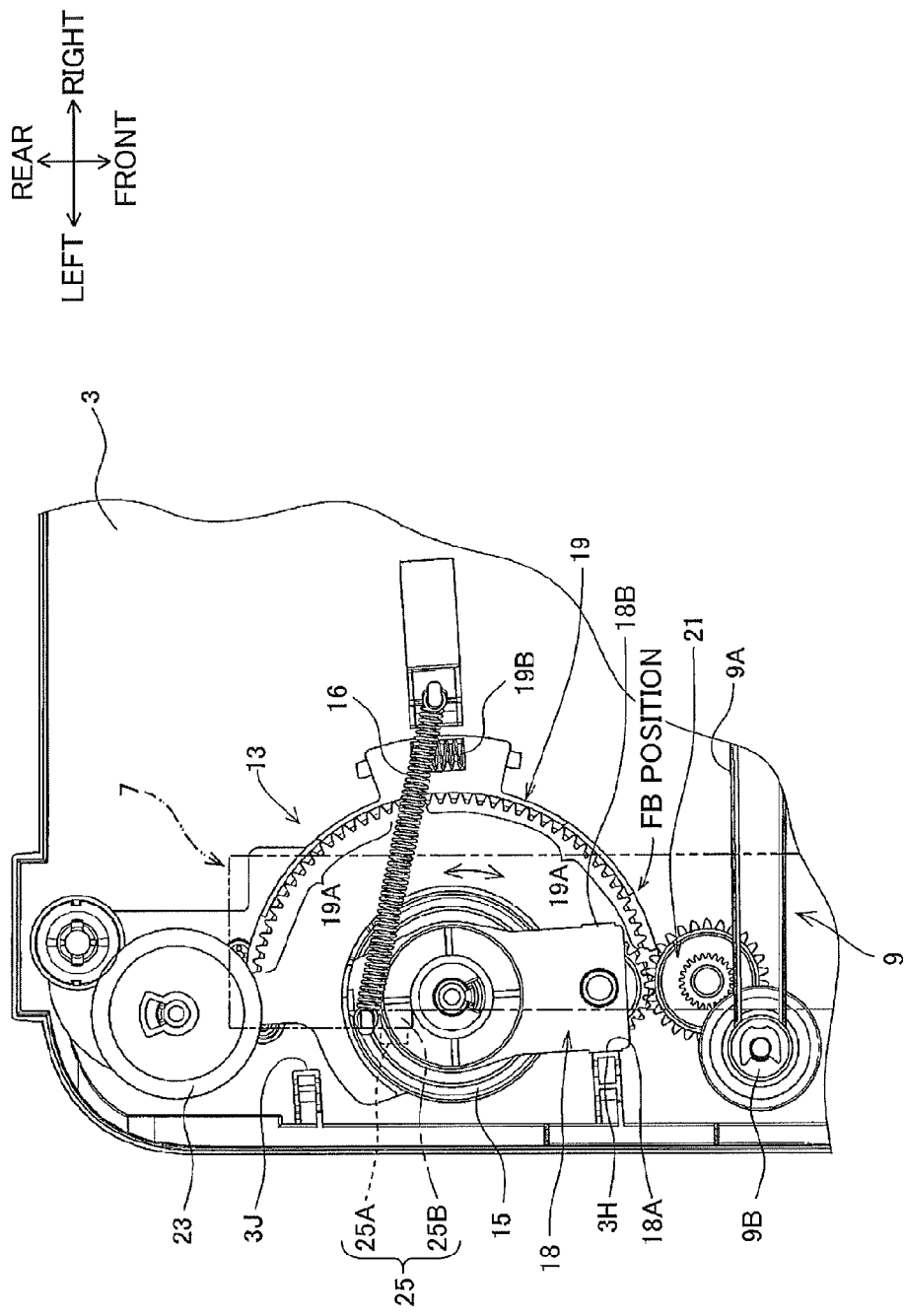
FIG. 4 is a schematic view of a drive transmission mechanism of the image reading apparatus in a state where a planetary gear is positioned at a FB position according to the preferred embodiment of the present invention.

As shown in FIG. 4, the drive transmission mechanism 13 according to the present embodiment includes: a planetary gear mechanism having a sun gear 15, a planetary gear 17, and an engagement portion 19; a FB side transmission gear 21; and an ADF side transmission gear 23. The sun gear 15, the planetary gear 17, the FB side transmission gear 21, and an ADF side transmission gear 23 respectively corresponds to a motor gear, a switching gear, a carriage gear, and a conveyance gear of the present invention.

The sun gear 15 transmits the power supplied from the motor 31 (see FIG. 6) to the planetary gear 17 and rotates without a displacement relative to the platen 3. The sun gear 15 rotates by obtaining drive power from the motor 31. In the present embodiment, a rotation direction of the motor 31 and that of the sun gear 15 coincide with each other, and thus the sun gear 15 rotates in a normal rotation direction and a reverse rotation direction in accordance with the rotation direction of the motor 31.

In the FB reading mode, the FB side transmission gear 21 transmits the power from the motor 31 to the carriage 8. On the other hand, in the ADF reading mode, the ADF side transmission gear 23 transmits the power from the motor 31 to the conveyance unit 44.

The planetary gear 17 switches its position as follows. That is, in the ADF reading mode, the planetary gear 17 is engaged with the ADF side transmission gear 23 at a ADF position (example of a first position) so as to connect the sun gear 15 with the ADF side transmission gear 23 in FIG. 5; while, in the FB reading mode, the planetary gear 17 is engaged with the FB side transmission gear 21 at a FB position (example of a second position) so as to connect the sun gear 15 with the FB side transmission gear 21 in FIG. 4. Further, the planetary gear 17 can rotate about a center thereof while being engaged with the sun gear 15 and revolve between the FB position illustrated in FIG. 4 and the ADF position illustrated in FIG. 5 about the sun gear 15 as a revolution center.

When the sun gear 15 rotates, the planetary gear 17 is applied with a rotation force for rotating the planetary gear 17 and a revolution force for revolving the planetary gear 17. Thus, when the sun gear 15 rotates in the normal direction (clockwise direction in FIG. 4), the planetary gear 17 is applied with a revolution force directed from the ADF position to FB the position (i.e., clockwise direction in FIG. 4).

On the other hand, when the sun gear rotates in the reverse direction (counterclockwise direction in FIG. 4), the planetary gear 17 is applied with a revolution force directed from the FB position to ADF position (i.e., counterclockwise direction in FIG. 4). When the revolution force becomes larger, the planetary gear 17 revolves in the direction of the revolution force. While the revolution force is small, the planetary gear 17 rotates without the revolution.

When the sun gear 15 rotates in the normal direction, the planetary gear 17 rotates in a normal rotation direction. Similarly, when the sun gear 15 rotates in the reverse direction, the planetary gear 17 rotates in a reverse rotation direction. The normal rotation direction of the planetary gear 17 and the normal direction of the sun gear 15 are opposed to each other, and the reverse rotation direction of the planetary gear 17 and the reverse direction of the sun gear 15 are opposed to each other, respectively.

The planetary gear 17 is supported on an arm 18 so as to be rotatable and revolvable. The arm 18 has one end in an extending direction thereof rotatably supported coaxially on the sun gear 15 and the other end where the planetary gear 17 is rotatably assembled.

The document platen 3 has a second stopper 3H and a third stopper 3J each restricting excessive rotation of the arm 18. On the other hand, the arm 18 has a second contacted portion 18A in contact with the second stopper 3H and a third contacted portion 18B in contact with the third stopper 3J.

Figure 5:
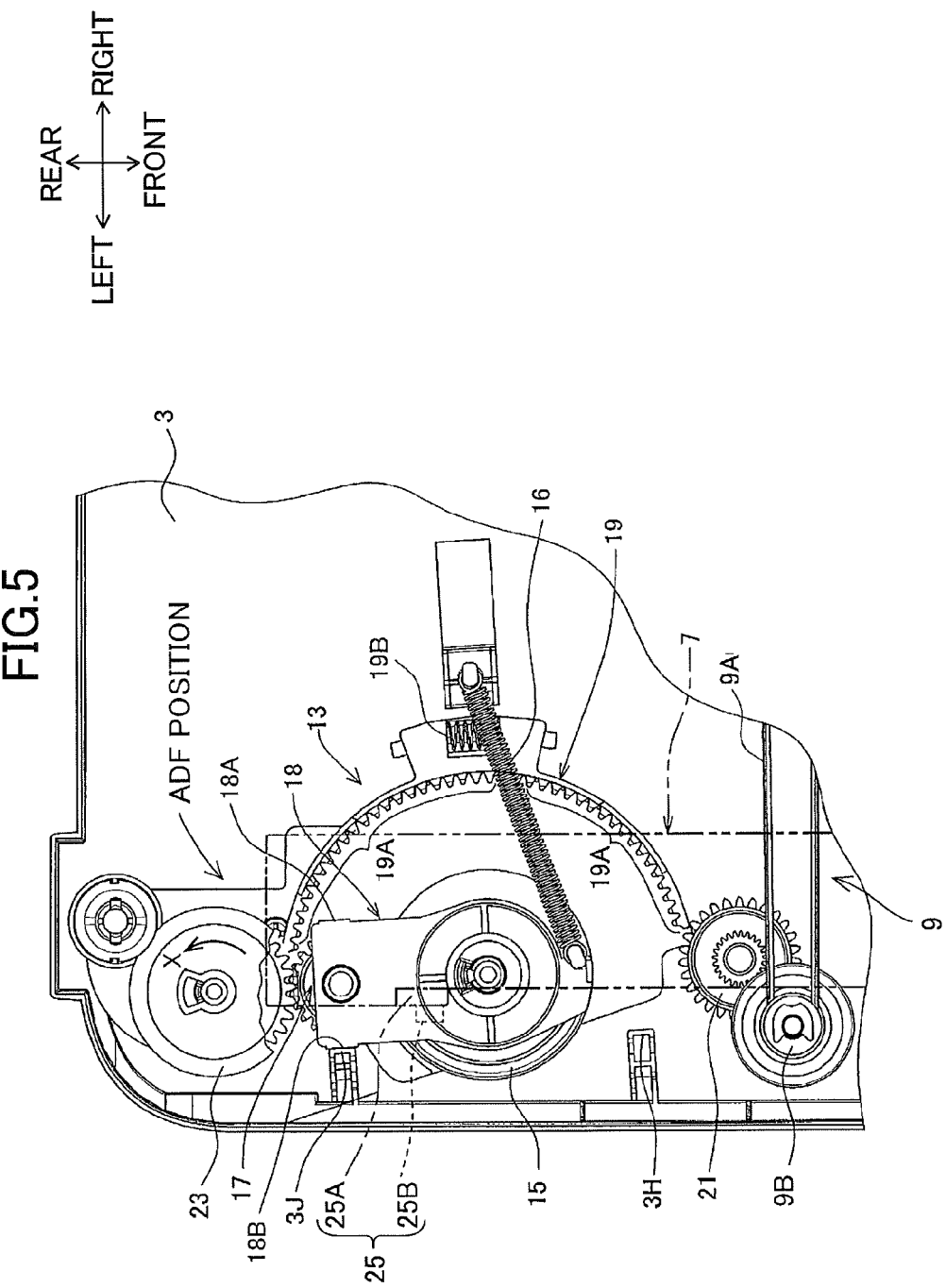
FIG. 5 is a schematic view of the drive transmission mechanism in a state where the planetary gear is positioned at an ADF position to the preferred embodiment of the present invention.

As shown in FIG. 4, when the planetary gear 17 is positioned at the FB position, the second stopper 3H is in contact with the second contacted portion 18A to restrict further clockwise rotation of the arm 18. Further, as shown in FIG. 5, when the planetary gear 17 is positioned at the ADF position, the third stopper 3J is in contact with the third contacted portion 18B to restrict further counterclockwise rotation of the arm 18.

A first spring 16 is provided for urging the arm 18 so as to prevent the revolving of the planetary gear 17 when the planetary gear 17 is positioned at the FB position or the ADF position. More specifically, in the FB reading mode, the first spring 16 prevents the planetary gear 17 from being separated from the FB side transmission gear 21 while the sun gear 15 rotates in the reverse direction. That is, the first spring 16 applies to the planetary gear 17 a first inhibiting force preventing the planetary gear 17 from revolving toward the ADF position at least when the planetary gear 17 is positioned at the FB position.

The first spring 16 used in the present embodiment is an extension coil spring. The first spring 16 has a one end in an extension direction thereof connected to one side of the arm 18 opposite to the planetary gear 17 with respect to a swing center of the arm 18 and the other end connected to the document platen 3. Thus, the first spring 16 applies to the arm 18 a second inhibiting force preventing the planetary gear 17 from revolving toward the FB position when the planetary gear 17 is positioned at the ADF position.

As described later, in a state where the planetary gear 17 is positioned at the ADF position, a drive force is transmitted to the conveyance unit 44, and the sun gear 15 is rotating in the reverse direction. While the sun gear 15 rotates in the reverse direction, the planetary gear 17 is applied with a force for revolving from the FB position to the ADF position. Thus, in the present embodiment, even if the second inhibiting force is absent, the planetary gear 17 stays at the ADF position at least while the drive force is transmitted to the conveyance unit 44, that is, while the sun gear 15 rotates in the reverse direction.

In view of the above, in the present embodiment, the first inhibiting force for preventing the revolution of the planetary gear 17 when the planetary gear is positioned at the FB position due is made larger than the second inhibiting force for preventing the revolution of the planetary gear 17 when the planetary gear 17 is positioned at the ADF position.

Specifically, the one end and the other end each of the first spring 16 are located such that a deformation amount of the first spring 16 when the planetary gear 17 is positioned at the FB position (FIG. 4) is larger than that of the first spring 16 when the planetary gear 17 is positioned at the ADF position (FIG. 5).

The engagement portion 19 is engaged with the planetary gear 17 while the planetary gear 17 revolves between the FB position and the ADF position. In the present embodiment, the engagement portion 19 is constituted by an internally-toothed gear. As shown in FIG. 4, the engagement portion 19 is provided with a plurality of projections 19A projecting toward the sun gear 15, and the projections 19A are arranged along a revolution path of the planetary gear 17.

The engagement portion 19 is assembled to the document platen 3 so as to be movable relative to the sun gear 15. Specifically, in the present embodiment, the engagement portion 19 is movable along the revolution path of the planetary gear 17 about the sun gear 15. A second spring 19B for urging the engagement portion 19 to an original position thereof is provided.

The ADF side transmission gear 23 is provided on the hinge mechanism 5A relative to the FB side transmission gear 21 in a direction parallel to the placement surface 3A and perpendicular to the moving direction of the reading unit 7 (i.e., front-to-rear direction in the present embodiment). Further, the ADF side transmission gear 23 is a gear rotating only in one direction. Thus, the ADF side transmission gear 23 has a mechanism that allows rotation in an X-direction (counter-clockwise direction in FIG. 5) by which the conveyance unit 44 conveys the document and prevents rotation in a direction reverse to the X-direction. For example, as the mechanism for preventing the reverse rotation, a known reverse rotation preventing claw (not shown) can be employed.

That is, as shown in FIG. 4, the FB side transmission gear 21 is provided at a position opposed to the ADF side transmission gear 23 with respect to the sun gear 15. The sun gear 15, the planetary gear 17, the FB side transmission gear 21, and the ADF side transmission gear 23 respectively have a rotational axis orthogonal to the placement surface 3A.

Further, as shown in FIG. 4, the FB side transmission gear 21 is engaged with the planetary gear 17 when the planetary gear 17 is positioned at the FB position. Thus, when the planetary gear 17 is positioned at the FB position, the drive power is transmitted from the sun gear 15 to the FB side transmission gear 21 through the planetary gear 17. Then, the FB side transmission gear 21 drives the first toothed pulley 9B to thereby activate the moving mechanism 9.

When the sun gear 15 rotates in the normal direction, the moving mechanism 9 moves the carriage 8, i.e., the reading unit 7 in the direction of the arrow A of FIG. 3, while when the sun gear 15 rotates in the reverse direction, the moving mechanism 9 moves the carriage 8, i.e., the reading unit 7 in the direction of the arrow B of FIG. 3. That is, the moving direction of the reading unit 7 is determined depending on the rotational direction of the sun gear 15.

As shown in FIG. 5, the ADF side transmission gear 23 is engaged with the planetary gear 17 when the planetary gear 17 is positioned at the ADF position. Thus, when the planetary gear 17 is positioned at the ADF position, the drive power is transmitted from the sun gear 15, through the planetary gear 17, to the ADF side transmission gear 23 to thereby activate the conveyance unit 44.

As shown in FIG. 2 and the like, the load generation unit 25 is provided for increasing a rotational resistance of the FB side transmission gear 21. The load generation unit 25 increases the rotational resistance of the FB side transmission gear 21 when the carriage 8, i.e., the reading unit 7 is positioned at the ADF reading position RP as compared to that when the reading unit 7 is at a position other than the ADF reading position RP.

That is, in the present embodiment, the load generation unit 25 includes the first contacted portions 25A provided in the reading unit 7 and the first stoppers 25B provided in the document platen 3. The first contacted portions 25A and the first stoppers 25B contact each other, as shown in FIG. 4.

Thus, when the reading unit 7 is positioned at the ADF reading position RP while the sun gear 15 rotates in the reverse direction to bring the first contacted portions 25A and the first stoppers 25B into contact with each other, the movement of the reading unit 7 is restricted, which increases the rotational resistance of the FB side transmission gear 21.

Further, as shown in FIG. 2 and the like, each the first stoppers 25B of the load generation unit 25 is positioned at an end position in a range within which the carriage 8 is movable in a predetermined direction (right-to-left direction) and restricts the movement of the carriage 8 when the position of the planetary gear 17 is switched from the FB position to the ADF position.

[Operation of Drive Power Transmission Mechanism]

The FB reading mode will be described in detail. When the image reading apparatus 1 is in an inactive state, the reading unit 7 is positioned at the waiting position WP, and the planetary gear 17 is positioned at the FB position. When a user pushes the read start key 11A to start the FB reading, a CPU 20 described later rotates the motor 31 in the normal direction to rotate the sun gear 15 in the normal direction.

As a result, the reading unit 7 is moved from the waiting position WP toward the read end position PE. At this time, the planetary gear 17 is applied with the revolution force directed from the ADF position to the FB position. However, the second stopper 3H and the second contacted portion 18A contact with each other, and thus the planetary gear 17 rotates in the normal direction while staying at the FB position without revolution.

Then, the CPU 20 (see FIG. 6) rotates the motor 31 in the reverse direction when, for example, the number of drive steps of the motor 31 reaches a predetermined value to rotate the sun gear 15 in the reverse direction. Further, the CPU 20 stops the motor 31 when the reading unit 7 reaches the waiting position WP. As a result, the reading unit 7 is moved from the read end position RE to the waiting position WP.

While the sun gear 15 rotates in the reverse direction, the planetary gear 17 is applied with the revolution force directed from the FB position to the ADF position, that is, the revolution force in a direction away from the FB side transmission gear 21. However, the above revolution force is canceled by the first spring 16, so that the planetary gear 17 rotates in the reverse direction while staying at the FB position without revolution.

Next, the ADF reading mode will be described in detail. When the image reading apparatus 1 is in an inactive state, the reading unit 7 is positioned at the waiting position WP, and the planetary gear 17 is positioned at the FB position. When a user pushes the read start key 11A to start the ADF reading, the CPU 20 rotates the motor 31 in the reverse direction to rotate the sun gear 15 in the reverse direction.

As a result, the reading unit 7, i.e., the carriage 8, is moved from the waiting position WP to the ADF reading position RP. Then, when the reading unit 7 reaches the ADF reading position RP to bring the first stoppers 25B and the first contacted portions 25A into contact with each other, the movement of the reading unit 7 is restricted to increase the rotational resistance of the FB side transmission gear 21.

As the rotational resistance of the FB side transmission gear 21 increases, the rotation force of the planetary gear 17 is reduced and the revolution force of the planetary gear 17 to revolve from the FB position to the ADF position is increased. Then, when the revolution force exceeds the first inhibiting force of the first spring 16, the planetary gear 17 is brought into engagement with the engagement portion 19, whereby the planetary gear 17 starts to revolve toward the ADF position.

When the planetary gear 17 revolves to bring the third stopper 3J and the third contacted portion 18B into contact with each other, the revolution of the planetary gear 17 is stopped, and then the planetary gear 17 is brought into engagement with the ADF side transmission gear 23. Thus, drive power is transmitted to the conveyance unit 44, whereby conveyance of the document is started.

When the ADF reading is ended, the CPU 20 rotates the motor 31 in the normal direction. As a result, the planetary gear 17 is applied with the revolution force directed from the ADF position to the FB position.

Then, the revolution force exceeds the second inhibiting force of the first spring 16, the planetary gear 17 revolves toward the FB position. When the planetary gear 17 is positioned at the FB position, the planetary gear 17 is brought into engagement with the FB side transmission gear 21, so that the reading unit 7 is moved in the direction of the arrow A of FIG. 2 from the ADF reading position RP.

[Electrical Configuration of Image Reading Apparatus]

Figure 6:
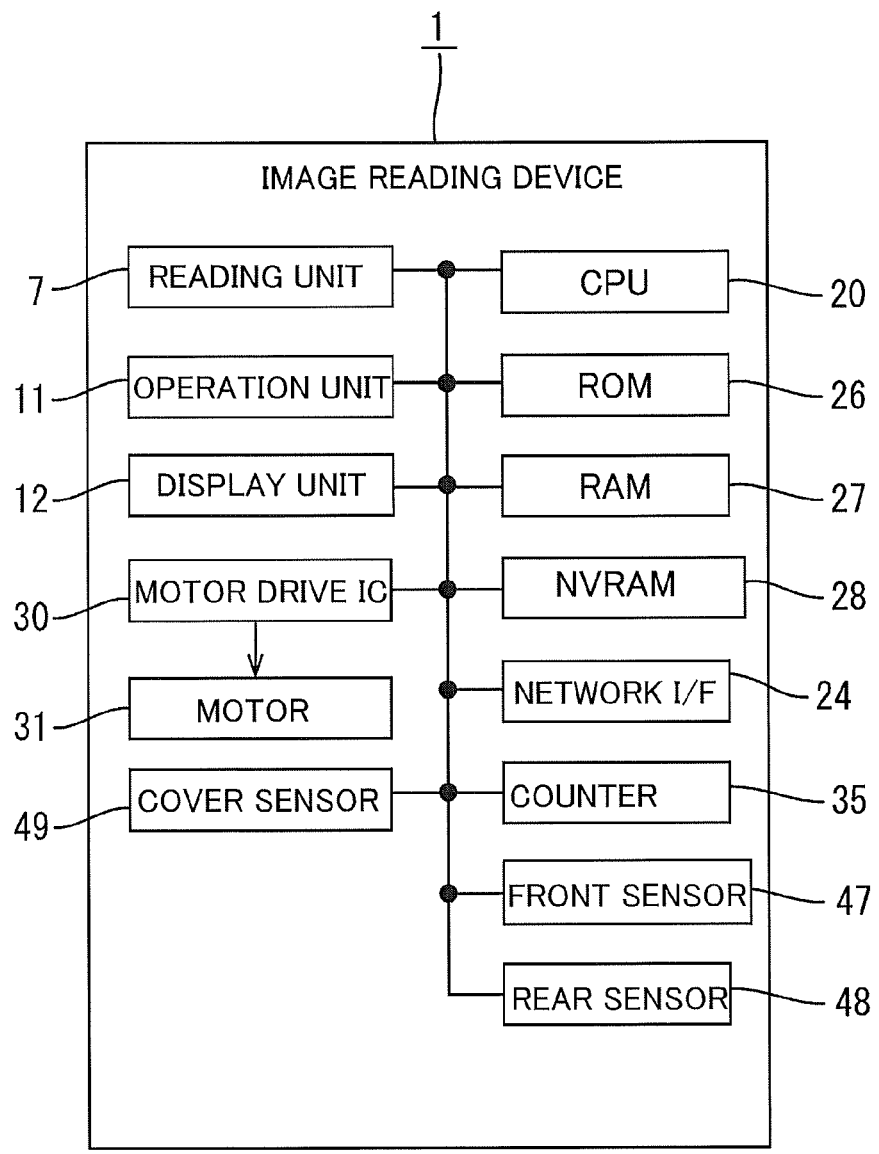
FIG. 6 is a block diagram illustrating an electric configuration of the image reading apparatus according to the preferred embodiment of the present invention.

As shown in FIG. 6, the image reading apparatus 1 includes the CPU (example of a control device) 20, a ROM 26, a RAM 27, an NVRAM (Non-Volatile RAM) 28, and a network interface (hereinafter, referred to as "network I/F") 24. The above components are connected with the reading unit 7, the operation unit 11, the display unit 12, a counter 35, the front sensor 47, the rear sensor 48, an ADF cover sensor 49 (example of a cover sensor), and a motor drive IC 30. The motor drive IC 30 is connected with the motor 31.

The operation unit 11 receives an instruction inputted by a user such as power ON/OFF, setting of reading resolution, start of reading operation, and clear of the jam.

The network I/F 24 is connected to an external user computer through a communication line (not illustrated), allowing data communication to be performed between the image reading apparatus 1 and the external user computer through the network I/F 24. The reading start instruction can be received from the external user computer through the network I/F 24.

The ROM 26 stores therein various programs for executing an ADF reading process described later and controlling operation of the image reading apparatus 1. The CPU 20 performs control for each unit of the image reading apparatus 1 according to a program read from the ROM 26 while storing a process result of the program in the RAM 27 or NVRAM 28. For example, the ROM 26 stores therein the number of steps for step-driving the motor 31. The storage device for storing above program may be a CD-ROM, a hard disk device, and a flash memory instead of the ROM 26.

The CPU 20 stores in the RAM 27, as setting data, conveyance document data related to the presence or absence of the document in the conveyance unit 44, tray document data related to a status of the supply tray 42, and cover status data related to a status of the ADF cover 41 during a jam occasion period from when the document jam occurs to when a user pushes the clear reception key 11C. The tray document data for the status of the supply tray 42 indicates whether or not the document is placed on the supply tray 42, and cover status data indicates whether the ADF cover 41 is open or closed.

The motor 31 is a stepping motor. The motor drive IC 30 controls drive of the motor 31 under control of the CPU 20. The counter 35 counts the number of steps to control the motor 31. The ADF cover sensor 49 (example of a cover sensor) detects an open state of the ADF cover 41. The ADF cover sensor 49 is turned ON upon the detection of the open state of the ADF cover 41.

The CPU 20 controls the motor drive IC 30 to control a torque and a rotation direction of the motor 31. A motor drive current and a motor torque have a proportional relationship, and thus increasing the drive current causes the motor torque to increase. Alternatively, the motor drive speed and the motor torque have an inverse relationship, and thus reducing the drive speed causes the motor torque to increase.

[ADF Reading Process]

The following describes embodiments of ADF reading process in the image reading apparatus 1 with reference to flowcharts of FIGS. 7 to 12. The ADF reading process in the following embodiments is a process that the CPU 20 executes according to a program stored in the ROM 26 when a user places the document on the supply tray 42, pushes the read start key 11A and then the CPU 20 receives an ADF reading instruction.

First Embodiment

Figure 7:
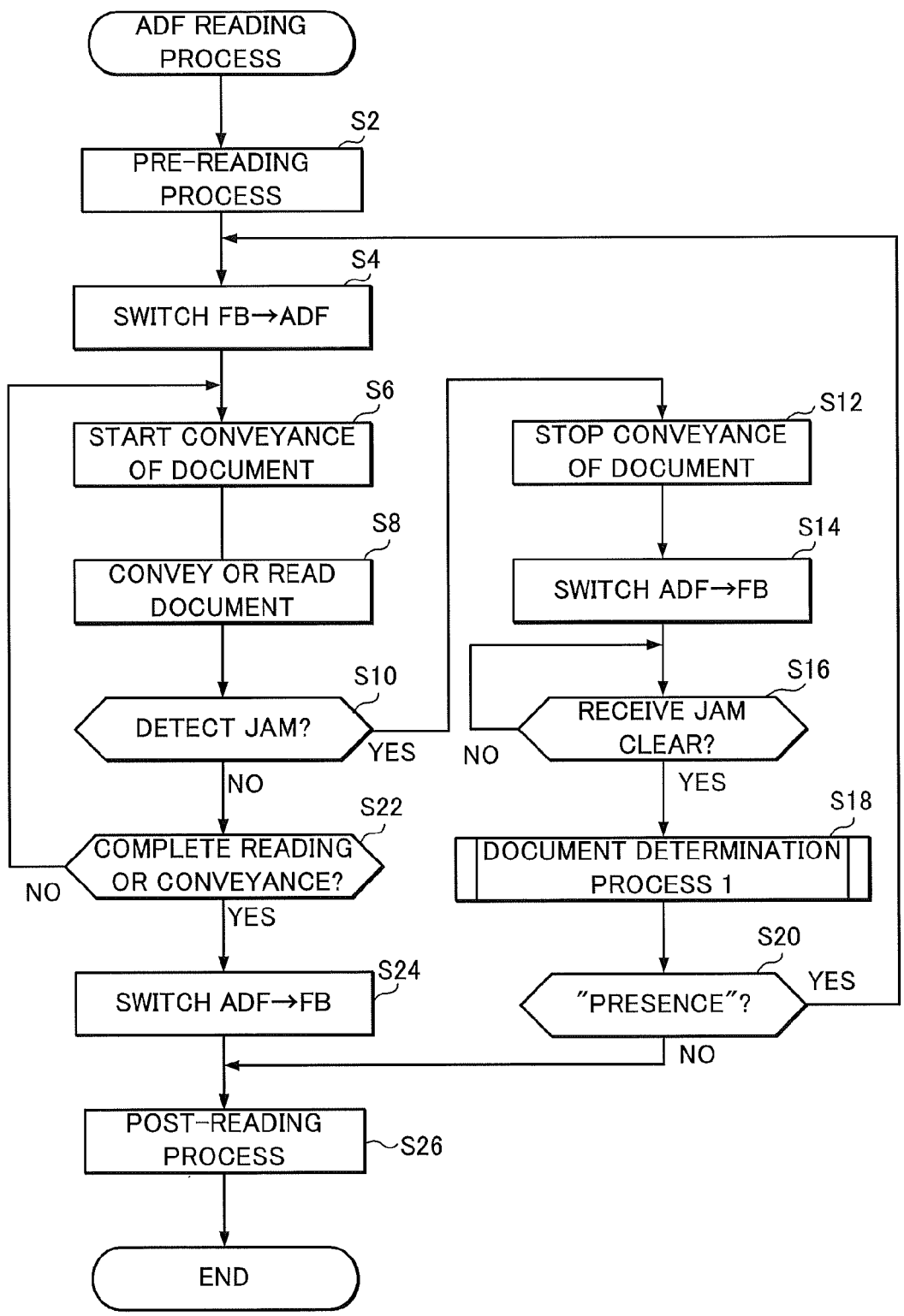
FIG. 7 is a flowchart illustrating an ADF reading process of the image reading apparatus according to a first embodiment of the present invention.
Figure 8:
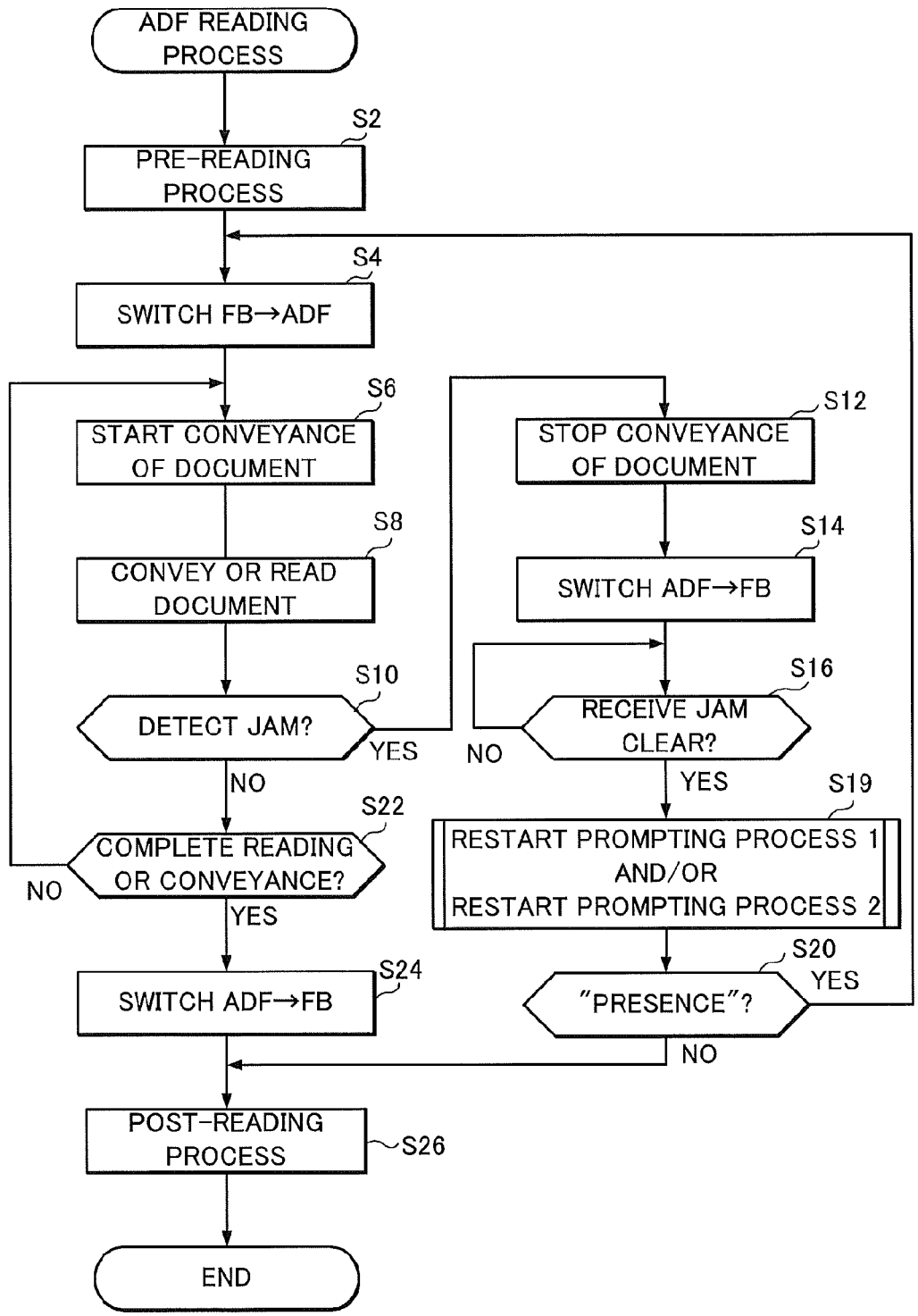
FIG. 8 is a flowchart illustrating an ADF reading process of an image reading apparatus according to a second embodiment of the present invention.

The ADF reading process according to a first embodiment will be described. As illustrated in FIG. 7, upon reception of the ADF reading instruction, the CPU 20 executes a pre-reading process (S2). In the pre-reading process, the CPU 20 executes acquisition process for acquiring initialization data initializing the reading unit 7 or correction data correcting reading data to be used in the ADF reading process.

The CPU 20 executes a switching process in which the motor 31 drives such that the planetary gear 17 is engaged with the ADF side transmission gear 23, i.e., the motor 31 is rotated in the reverse direction to switch the position of the planetary gear 17 from the FB position to ADF position (S4). In the switching process for switching the position of the planetary gear 17 from the FB position to the ADF position, reaction force from the FB side transmission gear 21 generated by the rotation of the planetary gear 17 according to the rotation of the sun gear 15 in the reverse direction needs to be larger than the inhibiting force of the first spring 16 inhibiting the revolution of the planetary gear 17. Thus, the motor torque of the motor 31 in the switching process is previously determined by, e.g., experiments such that the reaction force from the FB side transmission gear 21 is larger than the inhibiting force of the first spring 16 inhibiting the revolution of the planetary gear 17.

The reaction force from the FB side transmission gear 21 is caused by the rotational resistance of the FB side transmission gear 21 due to the load generation unit 25. That is, in this state, the FB side transmission gear 21 hardly rotates due to the load generation unit 25, so that the planetary gear 17 receives, upon start of the rotation thereof, the reaction force acting in a direction substantially opposite to a direction of the rotation thereof from the FB side transmission gear 21.

As described above, utilizing the reaction force from the FB side transmission gear 21 whose rotation is suppressed to the planetary gear 17 in the switching process, the position of the planetary gear 17 can appropriately be switched from the FB position to the ADF position without loss of synchronization of the planetary gear 17 with the motor 31.

Then, the CPU 20 rotates the rollers 44A to 44D of the conveyance unit 44 to start conveying the document placed on the supply tray 42 along the conveyance path 4 (S6). When the conveyance of the document is started, the document is drawn into the conveyance path 4, and reading of the document is executed in the conveyance path 4 (S8).

The document conveyed along the conveyance path 4 may be jammed in the conveyance path 4, that is, a document jam may occur. The CPU 20 determines whether or not the document jam occurs in the conveyance path 4 during reading of the document (S10). Specifically, the CPU 20 determines that the document jam occurs when the rear sensor 48 is turned ON for a predetermined time or more or when the rear sensor 48 is turned OFF for a prescribed time or more after the document is drawn into the conveyance path 4.

If in S10 the document jam occurs (S10:YES), the CPU 20 immediately stops rotation of the rollers 44A to 44D of the conveyance unit 44 to stop the conveyance of the document in the conveyance path 4 (S12). Then, the CPU 20 executes a drive process for driving the motor 31 in a direction in which the planetary gear 17 is engaged with the FB side transmission gear 21, that is, drives the motor in the normal direction to switch the position of the planetary gear 17 from the ADF position to the FB position (S14). This releases the engagement between the ADF side transmission gear 23 and the planetary gear 17, thereby preventing the rotation of the ADF side transmission gear 23 by the motor 31 while the user removes the document jammed in the conveyance path 4. The process executed in S14 is an example of the drive process.

In the present embodiment, while executing the drive process of S14, the CPU 20 controls the display unit 12 to display message such as "jam is detected, and removal of the jammed document is facilitated". This allows the user to understand the drive process executed in the image reading apparatus 1 when the drive process for switching the position of the planetary gear 17 from the ADF position to the FB position after the stop of the document conveyance.

The CPU 20 then determines whether or not the operation unit 11 receives a signal indicating the document jam is cleared (S16). That is, the CPU 20 determines whether or not the user pushes the clear reception key 11C. If the operation unit 11 does not receive the signal indicating the clear of the document jam (S16:NO), the CPU 20 repeatedly executes the process of S16 until the clear reception key 11C is pushed. If the operation unit 11 receives the signal indicating the clear of the document jam (S16:YES), the CPU 20 executes a document determination process 1 to be described later (S18). Hereinafter, the process executed in S16 is referred to as "jam clear determination process".

After completion of the document determination process 1, the CPU 20 determines whether the document is present in the conveyance unit 44 (S20). Specifically, the CPU 20 reads from the RAM 27 the conveyance document data. The conveyance document data is stored in the document determination process 1 to be described later and then the CPU 20 determines whether or not the conveyance document data indicates "presence". If the document is present in the conveyance unit 44, that is, if the conveyance document data read from the RAM 27 indicates "presence" (S20:YES), the CPU 20 returns to S4 and then executes once again the process of switching the position of the planetary gear 17 from the FB position to the ADF position (S4). The process of S4 that the CPU 20 executes once again is an example of re-drive process.

As described above, the CPU 20 executes the re-drive process of switching the position of the planetary gear 17 from the FB position to the ADF position when the conveyance document data indicates "presence" after the clear of the document jam. This allows the CPU 20 to advance to operation of discharging the document left in the conveyance unit 44 more immediately after the clear of the document jam.

After that, conveyance of the document is started (S6), and the document is conveyed to the conveyance path 4 (S8). By executing the process of conveying the document after the re-drive process, the document left in the conveyance path 4 is discharged to the discharge tray 43. The process of S8 that the CPU 20 executes once again is an example of discharging process.

If in S20 the document is absent in the conveyance unit 44, that is, if the conveyance document data read from the RAM 27 does not indicate "presence" (S20:NO), the CPU 20 executes post-reading process (S26). For example, in the post-reading process, the CPU 20 detects the waiting position WP of the carriage 8 and transfers the carriage 8 to the detected waiting position WP. After completion of the post-reading process, the CPU 20 ends the ADF reading process. The post-reading process that the CPU 20 executes in S26 is an example of transfer process.

On the other hand, if in S10 the document jam does not occur (S10:NO), the CPU 20 determines whether or not the ADF reading or the discharging process is completed for all the documents to be subjected to the ADF reading, that is, all the documents placed on the supply tray 42 (S22). Specifically, when, for example, the front sensor 47 or the rear sensor 48 is continuously turned ON, the CPU 20 determines that the ADF reading or discharging process for all the documents placed on the supply tray 4 is not completed.

If in S22 the reading or conveyance of the document in the conveyance path 4 is not completed (S22:NO), the CPU 20 returns to S8 and then executes reading or conveyance of the document left in the supply tray 42 or conveyance path 4 (S8). If in S22 the reading or conveyance of the document in the conveyance path 4 is completed (S22:YES), the CPU 20 executes the same process as that executed in S14, that is, rotates the motor 31 in the normal direction to switch the position of the planetary gear 17 from the ADF position to the FB position (S24). After completion of the process of S24, the CPU 20 executes the above-described post-reading process (S26). After completion of the post-reading process, the CPU 20 ends the ADF reading process.

[Document Determination Process 1]

Figure 9:
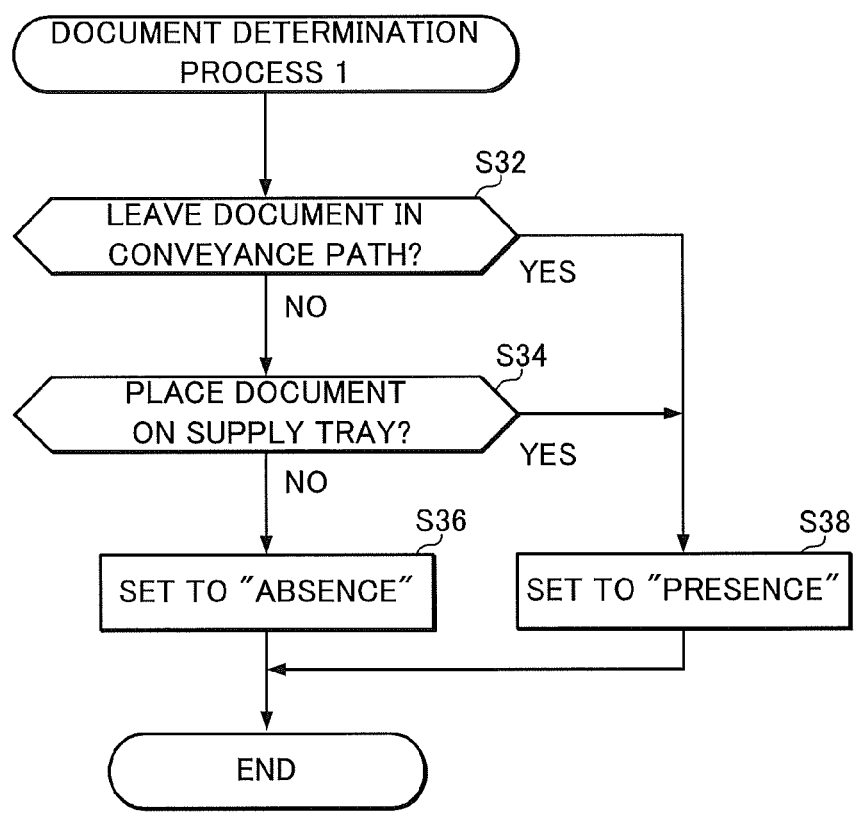
FIG. 9 is a flowchart illustrating a document determination process 1 according to the first embodiment of the present invention.

The following describes the document determination process 1 that the CPU 20 executes in S18 with reference to FIG. 9. The CPU 20 determines whether or not the document is left in the conveyance path 4 (S32). Specifically, the CPU 20 determines whether or not the rear sensor 48 detects the document to be turned ON.

If in S32 the document is left in the conveyance path 4, that is, if the rear sensor 48 detects the document to be turned ON (S32:YES), the CPU 20 sets the conveyance document data to "presence", stores the conveyance document data in the RAM 27 (S38), and then ends the document determination process 1.

On the other hand, if in S32 the document is not left in the conveyance path 4, that is, if the rear sensor 48 is in OFF (S32:NO), the CPU 20 determines whether or not the document is placed on the supply tray 42 (S34). Specifically, the CPU 20 determines whether a detection signal indicating the presence or absence of the document is output from the front sensor 47.

If in S34 the document is placed on the supply tray 42, that is, if the front sensor 47 detects the document to be turned ON (S34:YES), the CPU 20 sets the conveyance document data to "presence", stores the conveyance document data in the RAM 27 (S38), and then ends the document determination process 1.

On the other hand, if in S34 the document is not placed on the supply tray 42, that is, if the front sensor 47 is in OFF (S34:NO), the CPU 20 sets the conveyance document data to "absence", stores the conveyance document data in the RAM 27 (S36), and then ends the document determination process 1.

Effects of First Embodiment

The following describes effects of the ADF reading process according to the first embodiment. The image reading apparatus 1 of the present embodiment has a configuration in which the carriage 8 and the conveyance unit 44 are driven by single motor 31. When the document jam occurs in the conveyance path 4, engagement between the ADF side transmission gear 23 and the planetary gear 17 is released, facilitating for the user the clear of the document jam. After that, when receiving the signal indicating the clear of the document jam by the user, the CPU 20 executes the document determination process 1 to determine whether or not the document is left in the conveyance unit 44 or the supply tray 42.

If the document is present in the conveyance unit 44 in the document determination process 1, that is, if the conveyance document data indicates "presence", the CPU 20 executes the re-drive process for driving the motor 31 in a direction in which the planetary gear 17 is engaged with the ADF side transmission gear 23. This allows the CPU 20 to advance the discharge process for discharging the document left in the conveyance unit 44 immediately after the clear of the document jam. As described above, the image reading apparatus 1 of the present embodiment has a configuration in which the carriage 8 and the conveyance unit 44 are driven by the single motor 31, as well as, the planetary gear 17 can be retained at an appropriate position after the clear of the jam.

Further, the image reading apparatus 1 of the present embodiment is provided with the rear sensor 48 adapted to detect the presence or absence of the document to be conveyed by the conveyance unit 44 and outputs the detection signal thereof. The CPU 20 determines, based on the output from the rear sensor 48, the presence or absence of the document in the conveyance unit 44 in the re-drive process. As described above, the presence or absence of the document can be detected correctly by the rear sensor 48, thereby increasing a possibility that the CPU 20 executes the re-drive process when necessary.

Further, the image reading apparatus 1 of the present embodiment is provided with the display unit 12. When executing the drive process corresponding to the process of S14, the CPU 20 controls the display unit 12 to display message indicating that the jam clear operation can be easily performed. The execution of the drive process causes the motor 31 to be rotated in a direction so that the planetary gear 17 disengages the ADF side transmission gear 23, facilitating the clear of jam. According to the image reading apparatus 1 of the present embodiment, the user can get the message indicating that the jam clear operation can be facilitated at a timing when the jam clear operation becomes easy to perform.

Further, in the image reading apparatus 1 of the present embodiment, the carriage 8 is positioned at the waiting position WP when the ADF reading or the FB reading is not executed. If the front sensor 47 and the rear sensor 48 are each in OFF, the CPU 20 sets the conveyance document data to "absence". Then, the CPU 20 controls the gear switching to retain the planetary gear 17 at the FB position and then transfers the carriage 8 to the waiting position WP. As described above, in the present embodiment, the carriage 8 is transferred to the waiting position WP when no document is left in the conveyance unit 44, thereby advancing to the FB reading process for other documents immediately.

Second Embodiment

The ADF reading process according to a second embodiment will be described. The ADF reading process of the second embodiment is the same as that of the first embodiment except for the process of S18 (see FIG. 7) in the flow-chart of the ADF reading process of the first embodiment. Thus, descriptions of the same process procedures as those of the first embodiment are omitted.

In the ADF reading process of the second embodiment, if, in the jam clear determination process to be executed in S16, the signal for the clear of the document jam is received (S16:YES), the CPU 20 executes at least one of restart prompting process 1 and restart prompting process 2 each described later (S19). After completion of the process of S19, the routine advances to S20. The process of S20 and subsequent process procedures are the same as those in the first embodiment. Which one of the restart prompting process 1 and the restart prompting process 2 is executed or whether or not the restart prompting process 1 and restart prompting process 2 are executed in combination may be previously set in a program stored in the ROM 26.

[Restart Prompting Process 1]

Figure 11:
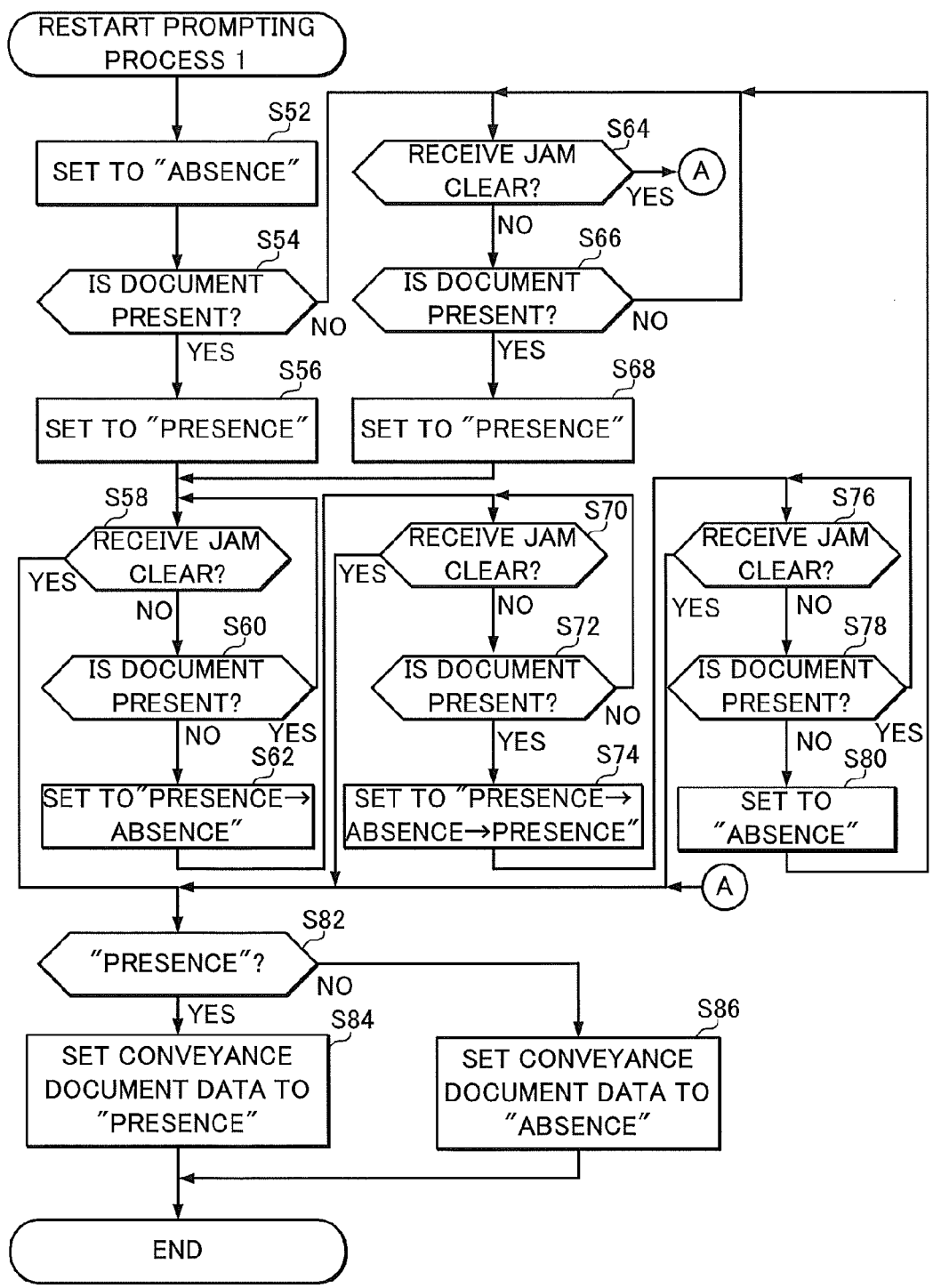
FIG. 11 is a flowchart illustrating a restart prompting process 1 according to the second embodiment of the present invention.

The following describes the restart prompting process 1 that the CPU 20 executes in S19 with reference to FIG. 11. In the restart prompting process 1, the CPU 20 sets the tray document data stored in the RAM 27 to "absence" and stores the tray document data in the RAM 27 (S52).

Subsequently, the CPU 20 determines whether or not the document is placed on the supply tray 42 (S54). Specifically, the CPU 20 determines whether or not the front sensor 47 detects the document to be turned ON (S54). Hereinafter, the same process as that executed in S54 is referred to as "tray document detection process".

If in S54 the document is placed on the supply tray 42, that is, if the front sensor 47 detects the document to be turned ON (S54:YES), the CPU 20 sets the tray document data to "presence", stores the tray document data in the RAM 27 (S56), and advances to S58. On the other hand, if in S54 the document is not placed on the supply tray 42, that is, if the front sensor 47 is in OFF (S54:NO), the CPU 20 advances to S64.

In S58, the CPU 20 executes the jam clear determination process for determining whether or not the operation unit 11 receives the signal indicating the clear of the document jam (S58). If in S58 the signal indicating the clear of the document jam is received (S58:YES), the CPU 20 advances to S82. On the other hand, if in S58 the signal indicating the clear of the document jam is not received (S58:NO), the CPU 20 advances to S60 and then executes the tray document detection process (S60).

If in S60 the document is placed on the supply tray 42 (S60:YES), the CPU 20 returns to S58 and then executes the jam clear determination process. On the other hand, if in S60 the document is not placed on the supply tray 42 (S60:NO), the CPU 20 sets the tray document data to "presence→absence", stores the tray document data in the RAM 27 (S62), and advances to S70.

In S64, the CPU 20 executes the jam clear determination process (S64). If in S64 the signal indicating the clear of the document jam is received (S64:YES), the CPU 20 advances to S82. On the other hand, if in S60 the signal indicating the clear of the document jam is not received (S64:NO), the CPU 20 advances to S66 and then executes the tray document detection process (S66).

If in S66 the document is placed on the supply tray 42 (S66:YES), the CPU 20 sets the tray document data to "presence", and stores the tray document data in the RAM 27 (S68). Then, the CPU 20 advances to S58 and then executes the jam clear determination process. On the other hand, if in S66 the document is not placed on the supply tray 42 (S66:NO), the CPU 20 returns to S64 and then executes the jam clear determination process.

In S70, the CPU 20 executes the jam clear determination process (S70). If in S70 the signal indicating the clear of the document jam is received (S70:YES), the CPU 20 advances to S82. On the other hand, if in S70 the signal indicating the clear of the document jam is not received (S70:NO), the CPU 20 advances to S72 and then executes the tray document detection process (S72).

If in S72 the document is not placed on the supply tray 42 (S72:NO), the CPU 20 returns to S70 and then executes the jam clear determination process. On the other hand, if in S72 the document is placed on the supply tray 42 (S72:YES), the CPU 20 sets the tray document data to "presence→absence→presence", stores the tray document data in the RAM 27 (S74), and advances to S76.

In S76, the CPU 20 executes the jam clear determination process (S76). If in S76 the signal indicating the clear of the document jam is received (S76:YES), the CPU 20 advances to S82. On the other hand, if in S76 the signal indicating the clear of the document jam is not received (S76:NO), the CPU 20 advances to S78 and then executes the tray document detection process (S78).

If in S78 the document is placed on the supply tray 42 (S78:YES), the CPU 20 returns to S76 and then executes the jam clear determination process. On the other hand, if in S78 the document is not placed on the supply tray 42 (S78:NO), the CPU 20 sets the tray document data to "absence" and stores the tray document data in the RAM 27 (S80). Then, the CPU 20 advances to S64 and then executes the jam clear determination process.

As described above, in the restart prompting process 1, when the CPU 20 determines that the signal indicating the clear of the document jam is received in the jam clear determination process in S58, S64, S70, and S76, the CPU 20 advances to S82. In S82, the CPU 20 reads, from the RAM 27, the tray document data and determines whether or not the read tray document data indicates "presence" (S82).

If the tray document data indicates "presence" (S82:YES), the CPU 20 sets the conveyance document data stored in the RAM 27 to "presence" (S84) and then ends the restart prompting process 1.

On the other hand, if the tray document data does not indicate "presence" (S82:NO), that is, the tray document data indicates "presence→absence", "presence→absence→presence", or "absence", the CPU 20 sets the conveyance document data stored in the RAM 27 to "absence" (S86) and then ends the restart prompting process 1.

[Restart Prompting Process 2]

Figure 12:
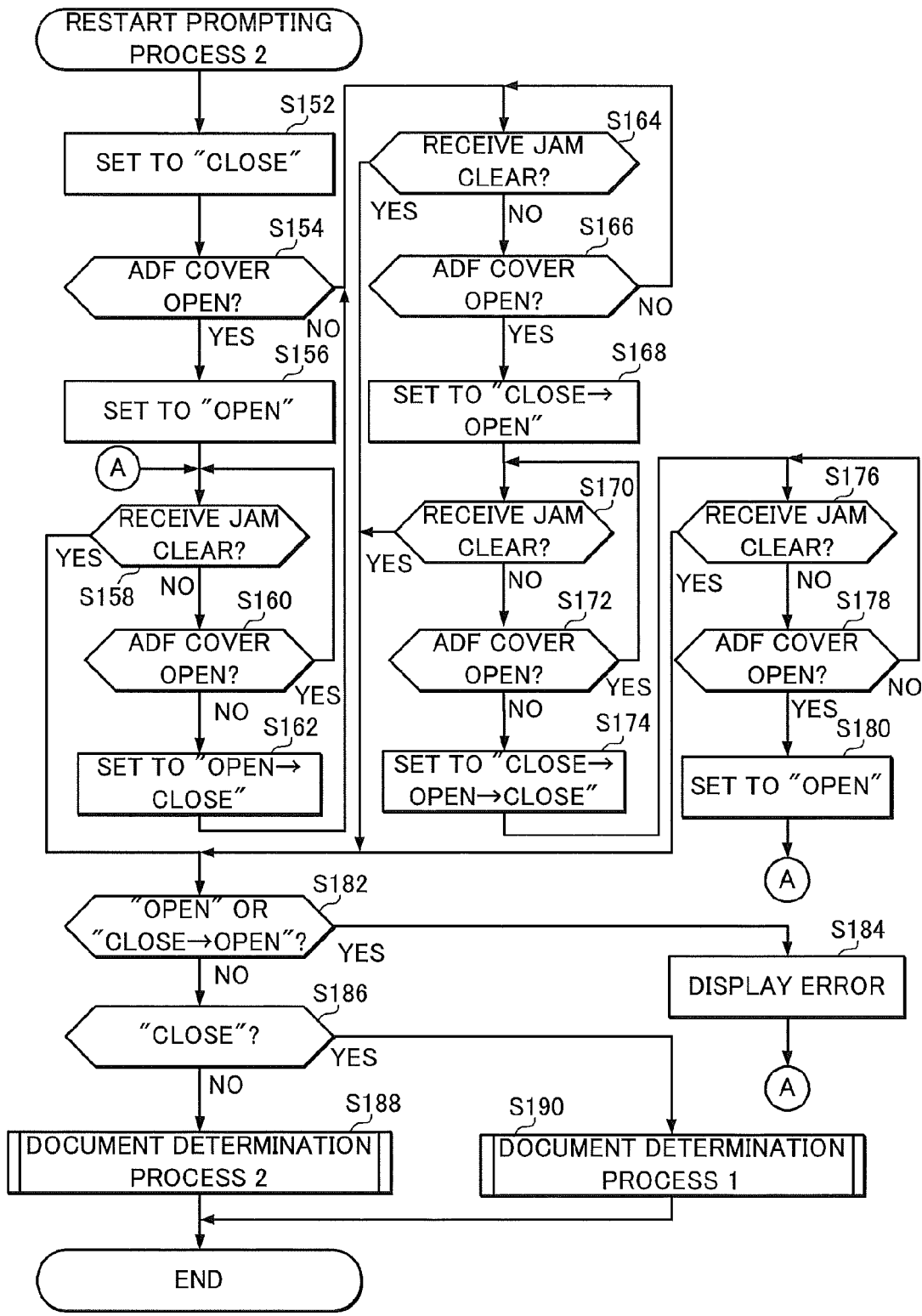
FIG. 12 is a flowchart illustrating a restart prompting process 2 according to the second embodiment of the present invention.

The following describes the restart prompting process 2 which the CPU 20 executes in S19 with reference to FIG. 12. In the restart prompting process 2, the CPU 20 sets the cover status data stored in the RAM 27 to "close" and stores the cover status data in the RAM 27 (S152).

Then, the CPU 20 determines whether or not the ADF cover 41 is open (S154). Specifically, the CPU 20 determines whether or not the ADF cover sensor 49 detects the open state of the ADF cover 41 to be turned ON. Hereinafter, the same process as that executed in S154 is referred to as "cover state detection process".

If in S154 the ADF cover 41 is open, that is, if the ADF cover sensor 49 detects the open state of the ADF cover 41 to be tuned ON (S154:YES), the CPU 20 sets the cover status data to "open", stores the cover status data in the RAM 27 (S156), and advances to S158. On the other hand, if in S154 the ADF cover 41 is closed, that is, if the ADF cover sensor 49 is in OFF (S154:NO), the CPU 20 advances to S164.

In S158, the CPU executes the jam clear determination process (S158). If in S158 the signal indicating the clear of the document jam is received (S158:YES), the CPU 20 advances to S182. On the other hand, if in S158 the signal indicating the clear of the document jam is not received (S158:NO), the CPU 20 advances to S160 and then executes the cover state detection process (S160).

If in S160 the ADF cover 41 is open (S160:YES), the CPU 20 returns to S158 and then executes the jam clear determination process. On the other hand, if in S160 the ADF cover 41 is not open (S160:NO), the CPU 20 sets the cover status data to "open→close" and stores the cover status data in the RAM 27 (S162). Then, the CPU 20 advances to S164 and then executes the jam clear determination process.

In S164, the CPU 20 executes the jam clear determination process (S164). If in S164 the signal indicating the clear of the document jam is received (S164:YES), the CPU 20 advances to S182. On the other hand, if in S164 the signal indicating the clear of the document jam is not received (S164:NO), the CPU advances to S166 and then executes the cover state detection process (S166).

If in S166 the ADF cover 41 is open (S166:YES), the CPU 20 sets the cover status data to "close→open", stores the cover status data in the RAM 27 (S168), and then advances to S170. On the other hand, if in S166 the ADF cover 41 is closed (S166:NO), the CPU 20 returns to S164 and then executes the jam clear determination process.

In S170, the CPU 20 executes the jam clear determination process (S170). If in S170 the signal indicating the clear of the document jam is received (S170:YES), the CPU 20 advances to S182. On the other hand, if in S170 the signal indicating the clear of the document jam is not received (S170:NO), the CPU 20 advances to S172 and then executes the cover state detection process (S172).

If in S172 the ADF cover 41 is open (S172:YES), the CPU 20 returns to S170 and then executes the jam clear determination process. On the other hand, if in S172 the ADF cover 41 is closed (S172:NO), the CPU 20 sets the cover status data to "close→open→close", stores the cover status data in the RAM 27 (S 174), and advances to S176.

In S176, the CPU 20 executes the jam clear determination process (S176). If in S176 the signal indicating the clear of the document jam is received (S176:YES), the CPU 20 advances to S182. On the other hand, if in S176 the signal indicating clear of the document jam is not received (S176:NO), the CPU 20 advances to S178 and then executes the cover state detection process (S178).

If in S178 the ADF cover 41 is closed (S178:NO), the CPU 20 returns to S176 and then executes the jam clear determination process. On the other hand, if in S178 the ADF cover 41 is open (S178:YES), the CPU 20 sets the cover status data to "open" and stores the cover status data in the RAM 27 (S180). Then, the CPU 20 returns to S158 and then executes the jam clear determination process.

As described above, in the restart prompting process 2, when the CPU 20 determines that the signal indicating the clear of the document jam is received in the jam clear determination process in S158, S164, S170, and S176, the CPU 20 advances to S182. In S182, the CPU 20 reads, from the RAM 27, the cover status data and determines whether or not the read cover status data indicates "open" or "close→open" (S182).

If the cover status data indicates "open" or "close→open" (S182:YES), the CPU 20 controls the display unit 12 to display an error message (S184). Then, the CPU 20 advances to S158 and then executes the jam clear determination process. In a case where the read cover status data indicates "open" or "close→open" upon the reception of the signal indicating the clear of the document jam, the ADF cover 41 is open, so that the document cannot be conveyed by the conveyance unit 44. In such a case, the display unit 12 displays the error message, thereby informing the user that the document cannot be conveyed by the conveyance unit 44.

On the other hand, if in S182 the read cover status data does not indicate "open" or "close→open" (S182:NO), the CPU 20 determines whether or not the cover status data read in S182 indicates "close" (S186).

In S186, if the cover status data read in S182 indicates "close" (S186:YES), the CPU 20 executes the document determination process 1 described above (S190) and then ends the restart prompting process 2. On the other hand, if the cover status data read in S182 does not indicate "close" (S186:NO), that is, the cover status data read in S182 indicates "open→close" or "close→open→close", the CPU 20 executes the document determination process 2 (S188) and then ends the restart prompting process 2.

[Document Determination Process 2]

Figure 10:
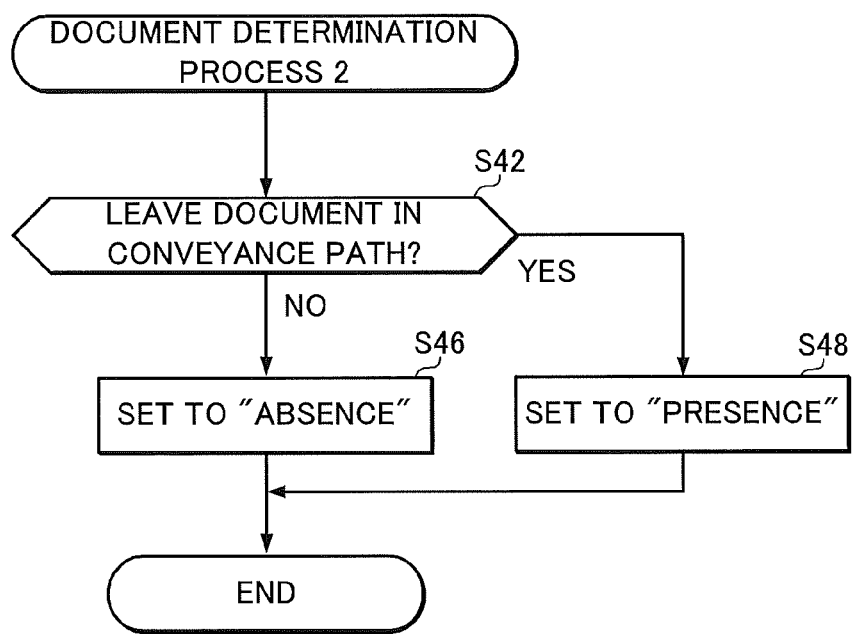
FIG. 10 is a flowchart illustrating a document determination process 2 according to the second embodiment of the present invention.

The following describes the document determination process 2 that the CPU 20 executes in S188 with reference to FIG. 10. In the document determination process 2, the CPU 20 determines whether or not the document is left in the conveyance path 4 (S42). Specifically, the CPU 20 determines whether or not the rear sensor 48 detects the document to be turned ON.

If in S42 the document is left in the conveyance path 4, that is, if the rear sensor 48 detects the document to be turned ON (S42:YES), the CPU 20 sets the conveyance document data to "presence", stores the conveyance document data in the RAM 27 (S48), and then ends the document determination process 2.

On the other hand, if in S42 the document is not left in the conveyance path 4, that is, if the rear sensor 48 in OFF (S42:NO), the CPU 20 sets the conveyance document data to "absence", stores the conveyance document data in the RAM 27 (S46), and then ends the document determination process 2.

As described above, in the document determination process 1, the CPU 20 determines the presence or absence of the document in the conveyance unit 44 using both the rear sensor 48 and the front sensor 47; while, in the document determination process 2, the CPU 20 determines the presence or absence of the document in the conveyance unit 44 using only the rear sensor 48. Thus, the document determination process 2 is reduced in load on the CPU 20 as compared to the document determination process 1.

Effects of Second Embodiment

Effects obtained when the restart prompting process 1 is executed in the ADF reading process of the present embodiment will be described. The image reading apparatus 1 includes the supply tray 42 on which the document to be conveyed by the conveyance unit 44 is placed, the discharge tray 43 to which the document that has been conveyed by the conveyance unit 44 and read by the reading unit 7 is discharged, and the front sensor 47 adapted to detect the presence or absence of the document placed on the supply tray 42 and outputs a signal indicating a detection result.

In the image reading apparatus 1 of the present embodiment, if the CPU 20 determines that the front sensor 47 detects the document to be turned ON without determining that the front sensor 47 is in OFF during a jam occasion period from when the document jam occurs to when the signal indicating the clear of the document jam is received, the CPU 20 executes the discharging process for discharging the document left in the conveyance unit 44 and in the supply tray 42 to the discharge tray 43 after the re-drive process. In other words, if the tray document data read from the RAM 27 indicates "presence" upon the reception of the signal indicating the clear of the document jam, the CPU 20 executes the discharging process of discharging the document left in the conveyance unit 44 and in the supply tray 42 to the discharge tray 43 after the re-drive process.

When the document is left in the supply tray 42 before and after occurrence of the document jam, the user may accidentally leave the document on the supply tray 42. Thus, in the image reading apparatus 1 of the present embodiment, the discharging process for discharging the document left by the user on the supply tray 42 is executed after the clear of the jam. As a result, the document left on the supply tray 42 is discharged to the discharge tray 43, so that no document is placed on the supply tray 42, thereby allowing subsequent ADF reading process to be restarted quickly.

Further, in the image reading apparatus 1 of the present embodiment, when the CPU 20 determines, at least once, that the front sensor 47 is in OFF during the jam occasion period from when occurrence of the document jam is determined in the jam determination process executed in S10 to when the signal indicating the clear of the document jam is received, the CPU 20 does not execute the discharging process. In other words, in a case where the tray document data read from the RAM 27 does not indicate "presence" upon the reception of the signal indicating the clear of the document jam, the CPU 20 does not execute the discharging document.

In such a case, there is a high possibility that a new document to be read is placed on the supply tray 42. If the discharging process is executed, the new document to be read and placed on the supply tray 42 is erroneously discharged. In the image reading apparatus 1 of the present embodiment, execution of such unnecessary discharging process can be avoided.

Further, in the image reading apparatus 1 of the present embodiment, when the CPU 20 determines, at least once, that the front sensor 47 is in OFF during the jam occasion period from when occurrence of the document jam is determined in the jam determination process executed in S10 to when the signal indicating the clear of the document jam is received, the CPU 20 does not execute the re-drive process, and then the planetary gear 17 has been retained at the FB position.

When the planetary gear 17 is retained at the FB position, the discharging process cannot be executed. That is, in the image reading apparatus 1 of the present embodiment, since the planetary gear 17 is retained at the FB position, thereby avoiding the unnecessary discharging process and the unnecessary switching of the position of the planetary gear 17 to the ADF position.

Further, in the image reading apparatus 1 of the present embodiment, in a case where the front sensor 47 detects the document to be turned ON and is then turned OFF during the jam occasion period and the front sensor 47 detects the document once again to be turned ON when the signal indicating the clear of the document jam is received, the CPU 20 does not execute the discharging process. That is, in a case where the tray document data read from the RAM 27 indicates "presence→absence→presence" upon the reception of the signal indicating the clear of the document jam, the CPU 20 does not execute the discharging process.

In such a case, there is a high possibility that the user places once again a document that has been taken out of the conveyance unit 44 at the time of the jam clear on the supply tray 42, together with other documents that have been placed on the supply tray 42 in order to read the documents once again. As described above, in the image reading apparatus 1 of the present embodiment, execution of such unnecessary discharging process for the documents placed again on the supply tray 42 can be avoided.

Next, effects obtained when the restart prompting process 2 is executed in the ADF reading process of the present embodiment will be described. The image reading apparatus 1 includes the openable ADF cover 41 provided in the conveyance unit 44 and the ADF cover sensor 49 adapted to detect the state of the ADF cover 41 and outputs a signal indicating a detection result.

In the image recording apparatus of the present embodiment, in a case where the ADF cover sensor 49 detects the close state of the ADF cover 41 to be turned ON and is then turned OFF during the jam occasion period and the ADF cover sensor 49 detects the close state of the ADF cover 41 once again to be turned ON upon the reception of the signal indicating the clear of the document jam, the CPU 20 retains the planetary gear 17 at the FB position. That is, in a case where the cover status data read from the RAM 27 indicates "open→close" or "close→open→close" upon the reception of the signal indicating the clear of the document jam, the CPU 20 retains the planetary gear 17 at the FB position.

When the signal indicating the clear of the document jam is received after the ADF cover 41 is once open, there is a high possibility that the user clears the jam after opening the ADF cover 41 and removing the jammed document from the conveyance unit 44. In such a case, there is a low possibility that the document is left in the conveyance unit 44, and there is less need to detect the presence or absence of the document with a plurality of sensors. Thus, according to the image reading apparatus 1 of the present embodiment, unnecessary use of a plurality of sensors for detection can be prevented, thereby preventing extra load from being applied to the CPU 20.

Further, in the image reading apparatus 1 of the present embodiment, in a case where the ADF cover sensor 49 detects a close state of the ADF cover 41 to be turned ON and is then turned OFF during the jam occasion period and the ADF cover sensor 49 detects the close state of the ADF cover 41 once again to be turned ON upon the reception of the signal indicating the clear of the document jam, the CPU 20 does not execute the discharging process.

As described above, when the signal indicating the clear of the document jam is received after the ADF cover 41 is once open, there is a high possibility that the user clears the jam after opening the ADF cover 41 and removing the jammed document from the conveyance unit 44. In such a case, there is a low possibility that the document is left in the conveyance unit 44, and thus there is less need to execute the discharging process. Thus, according to the image reading apparatus 1 of the present embodiment, unnecessary execution of the discharge process can be avoided.

Other Embodiments

The technology disclosed in the present specification is not limited to the embodiment described above with reference to the drawings but includes the following various embodiments.

(1) In the above embodiments, the position of the planetary gear is switched from the ADF side to FB side in the drive process. However, the drive process is not limited to the embodiment in which the planetary gear is switched to the FB position to be engaged with the FB side transmission gear. The drive process only needs to be processing that drives the motor in a direction in which the FB side transmission gear and planetary gear are engaged with each other to release engagement between the ADF side transmission gear and the planetary gear.

(2) In the second embodiment, one of the restart prompting process 1 and restart prompting process 2 is executed in S18. However, the restart prompting process 1 and the restart prompting process 2 may be executed in combination in S18.

(3) In the above embodiments, the CPU uses the front and rear sensors provided in the conveyance unit to detect the presence or absence of the document in the conveyance unit. However, another sensor may be provided in the conveyance unit. In this case, the CPU may detect the presence or absence of the document in the conveyance unit by using only another sensor or by using the other sensor in combination of the front and rear sensors.

In the above embodiments, the CPU determines in S10 whether or not the jam occurs by using the rear sensor. However, the present invention is not limited to this configuration. The CPU 10 may use another method to determine the occurrence of the jam in S10.

(5) In the above embodiments, the CPU receives a signal indicating the jam is cleared by depression of the clear reception key by the user. However, the present invention is not limited to this configuration. The CPU may receive the signal indicating the jam is cleared by another method.

(6) In the above embodiment, the CPU 20 is used as an example of a control device. However, the present invention is not limited to this configuration. The controller may be constituted by a plurality of circuits including an ASIC or may be constituted by the CPU and other circuits.

What is claimed is:

1. An image reading apparatus comprising:
    a reading unit;
    a conveyance unit configured to convey a document from a document tray;
    a carriage configured to support the reading unit;
    a motor;
    a motor gear coupled to the motor;
    a conveyance gear configured to communicate with the conveyance unit;
    a carriage gear configured to communicate with the carriage;
    a switching gear configured to be placed in either one of a first position where the motor gear is communicated with the conveyance gear via the switching gear and a second position where the motor gear is communicated with the carriage gear via the switching gear;
    a control device configured to:
        determine whether a document jam has occurred;
        control the motor to rotate the motor gear in a first direction to have the switching gear freed from the conveyance gear in response to a determination that the document jam has occurred;
        determine whether the document jam is cleared;

determine whether the document is present on the document tray; and control the motor to rotate the motor gear in a second direction different from the first direction to have the switching gear communicate with the conveyance gear in response to a determination that the document is present on the document tray when determining that the document jam is cleared.

2. The image reading apparatus according to claim 1, further comprising a document sensor configured to detect a presence or an absence of the document on the document tray, the document sensor being configured to output a first signal indicating the presence of the document or a second signal indicating the absence of the document, wherein the control device is configured to determine the presence of the document in accordance with the first signal from the document sensor.

3. The image reading apparatus according to claim 1, further comprising:

a discharge tray; and a document sensor configured to detect a presence or absence of the document on the document tray, the document sensor being configured to output a first signal indicating the presence of the document or a second signal indicating the absence of the document, wherein the control device controls the motor to rotate the motor gear in the second direction after having the switching gear communicate with the conveyance gear when the document sensor outputs the first signal during a jam occurrence period, the jam occurrence period defined from when the control device determines that the document jam has occurred to when the control device determines that the document jam is cleared.

4. The image reading apparatus according to claim 1, further comprising:

a discharge tray; and a document sensor configured to detect a presence or absence of the document on the document tray, the document sensor being configured to output a first signal indicating the presence of the document or a second signal indicating the absence of the document, wherein the control device controls the motor not to be driven when the document sensor outputs, at least once, the second signal during a jam occrruence period, the jam occurrence period defined from when the control device determines that the document jam has occurred to when the control device determines that the document jam is cleared.

5. The image reading apparatus according to claim 4, wherein the switching gear is retained at the second position when the document sensor outputs, at least once, the second signal during the jam occasion period.

6. The image reading apparatus according to claim 4, wherein the control device controls the motor not to be driven when, during the jam occurrence period, the document sensor outputs the first signal after outputting the second signal.

7. The image reading apparatus according to claim 1, further comprising:

a cover; and a cover sensor configured to detect a state of the cover and output a first signal indicating an open state of the cover or a second signal indicating a close state of the cover, wherein the switching gear is retained at the second position when, during a jam occurrence period from when the control device determines that the document jam has occurred to when the control device determines that the document jam is cleared, the cover sensor outputs the second signal, outputs the first signal, and then outputs the second signal.

8. The image reading apparatus according to claim 7, wherein the control device controls the motor not to be driven when, during the jam occurrence period, the cover sensor outputs the second signal, outputs the first signal, and then outputs the second signal.

9. The image reading apparatus according to claim 1, further comprising a display unit, wherein the control device controls the display unit to display a message indicating a facilitation of clearing the document jam when controlling the motor to rotate the motor gear in the first direction.

10. The image reading apparatus according to claim 1, wherein the carriage is positioned at a third position when the reading unit does not operate in a first mode or a second mode, and wherein the control device moves the carriage to the third position after retaining the carriage at the second position when determining that the document is present in a conveyance path.

* * * * *